US012057639B2

(12) United States Patent
Tang et al.

(10) Patent No.: US 12,057,639 B2
(45) Date of Patent: Aug. 6, 2024

(54) ANTENNA AND COMBINED ANTENNA

(71) Applicants: LINQ ANTENNA TECHNOLOGY INC., Foshan (CN); RELIA COMMUNICATION EQUIPMENT CO., LTD, Foshan (CN)

(72) Inventors: Hong Tang, Foshan (CN); Zhenlin Liao, Foshan (CN)

(73) Assignees: Relia Communication Equipment Co., Ltd., Foshan (CN); LinQ Antenna Technology Inc., La Puente, CA (US)

( * ) Notice: Subject to any disclaimer, the term of this patent is extended or adjusted under 35 U.S.C. 154(b) by 387 days.

(21) Appl. No.: 17/284,753

(22) PCT Filed: Jan. 28, 2021

(86) PCT No.: PCT/CN2021/074202
§ 371 (c)(1),
(2) Date: Apr. 12, 2021

(87) PCT Pub. No.: WO2022/155989
PCT Pub. Date: Jul. 28, 2022

(65) Prior Publication Data

US 2023/0105177 A1 Apr. 6, 2023

(30) Foreign Application Priority Data

Jan. 20, 2021 (CN) .......................... 202110076531.9
Jan. 20, 2021 (CN) .......................... 202120157827.9

(51) Int. Cl.
*H01Q 21/00* (2006.01)
*H01P 5/12* (2006.01)
(Continued)

(52) U.S. Cl.
CPC ........... *H01Q 21/0075* (2013.01); *H01P 5/12* (2013.01); *H01Q 1/36* (2013.01); *H01Q 1/50* (2013.01)

(58) Field of Classification Search
CPC ........................ H01Q 21/0075; H01P 5/12–18
See application file for complete search history.

(56) References Cited

U.S. PATENT DOCUMENTS

2013/0141186 A1 6/2013 Nguyen et al.
2020/0266510 A1* 8/2020 Menargues Gomez ..................... H01P 1/163
(Continued)

FOREIGN PATENT DOCUMENTS

CN 210074167 2/2020
CN 111262022 6/2020
(Continued)

OTHER PUBLICATIONS

International Search Report (mailing date Sep. 28, 2021) for PCT/CN2021/074202, filed on Jan. 28, 2021 with English language translation (8 pages).
(Continued)

*Primary Examiner* — Hasan Islam
(74) *Attorney, Agent, or Firm* — Snell & Wilmer LLP

(57) ABSTRACT

An antenna and a combined antenna are provided. The antenna comprises: a housing in which a first port and a second port are formed; a feeding network unit, which is disposed inside the housing and comprises a waveguide power divider connecting the first port and the second port, wherein the waveguide power divider is configured for dividing the electromagnetic wave transmitted from the first port to the second port, or merging the electromagnetic wave transmitted from the second port to the first port; a radiating unit, which comprises a radiator disposed on the housing and close to the second port. The antenna has the advantages of low loss, being suitable for high-power transmission. In addition, the antenna is relatively simple in structure, and therefore, is beneficial to reduce the overall volume of the antenna, so as to meet the miniaturization design requirements of the antenna.

15 Claims, 7 Drawing Sheets

(51) Int. Cl.
*H01Q 1/36* (2006.01)
*H01Q 1/50* (2006.01)

(56) References Cited

U.S. PATENT DOCUMENTS

| | | | | |
|---|---|---|---|---|
| 2021/0066813 | A1* | 3/2021 | Salman | H01Q 3/2617 |
| 2023/0011966 | A1* | 1/2023 | Menargues Gomez | H01P 5/12 |
| 2023/0019212 | A1* | 1/2023 | Wang | H01Q 19/10 |

FOREIGN PATENT DOCUMENTS

| | | |
|---|---|---|
| CN | 111799572 | 10/2020 |
| CN | 112186340 | 1/2021 |
| TW | 200947799 | 11/2009 |

OTHER PUBLICATIONS

International Preliminary Report on Patentability and Written Opinion dated Jul. 20, 2023 regarding PCT/CN2021/074202, English Translation.

* cited by examiner

ANTENNA AND COMBINED ANTENNA

The present application is a national stage application, filed under 35 U.S.C. § 371, of International Patent Application No. PCT/CN2021/074202, filed on Jan. 28, 2021 and entitled "Antenna and combined antenna," which claims the priority to a Chinese Patent Application No. 202110076531.9, filed with the China National Intellectual Property Administration on Jan. 20, 2021 and entitled "Antenna and combined antenna", and a Chinese Patent Application No. 202120157827.9, filed with the China National Intellectual Property Administration on Jan. 20, 2021 and entitled "Antenna and combined antenna", each of which are incorporated herein by reference in their entirety.

TECHNICAL FIELD

The present application relates to the technical field of communications, and in particular to an antenna and a combined antenna.

BACKGROUND

As electronic devices become smaller and smaller, the miniaturization of antennas matching the electronic devices is also required. In the related art, as the microstrip feeding network structure has advantages of low cost and small volume, antennas using the microstrip feeding network structure are more commonly used when facing miniaturization requirements. However, antennas with the microstrip feeding network structure also have defects such as a low maximum transmission power and high insertion loss. Therefore, there is an urgent need for a relatively small antenna that can meet the high-power transmission requirements.

SUMMARY

The purpose of the embodiments of the present disclosure is to provide an antenna and combined antenna, so as to solve the problem that the existing antenna cannot meet the requirements of high-power transmission and relatively small volume at the same time. Specifically, the technical solutions are as follows.

The embodiment in a first aspect of the present disclosure proposes an antenna, including: a housing in which a first port and a second port are formed; a feeding network unit, which is disposed inside the housing, the feeding network unit includes a waveguide power divider connecting the first port and the second port, and the waveguide power divider is configured for dividing an electromagnetic wave transmitted from the first port to the second port, or merging an electromagnetic wave transmitted from the second port to the first port; a radiating unit, which includes a radiator disposed on the housing and close to the second port.

The antenna according to an embodiment of the present disclosure includes a feeding network unit and a radiating unit, wherein the radiating unit further includes a waveguide power divider. The antenna can be used as a transmitting antenna, a receiving antenna, or an antenna with both transmitting and receiving functions. When the antenna is used as a transmitting antenna, the first port in the housing is a signal input port, and the second port is a signal output port. In this case, after the electromagnetic wave input from the first port is divided by the waveguide power divider, the electromagnetic wave is transmitted to the radiating unit through the second port, and is radiated to a free space by the radiator of the radiating unit. When the antenna is used as a receiving antenna, the second port in the housing is a signal input port, and the first port is a signal output port. In this case, the radiator of the radiating unit receives the electromagnetic wave from the free space and guides the electromagnetic wave into the second port. After the electromagnetic wave enters the second port and is merged by the waveguide power divider, the electromagnetic wave is output through the first port. The antenna in the embodiment of the present disclosure constructs feeding network by using a waveguide power divider, and the waveguide power divider itself has the characteristics of low loss and being suitable for high-power transmission. Therefore, the antenna in the embodiment of the present disclosure also has the advantages of low loss and being suitable for high-power transmission. In addition, antenna in the embodiment of the present disclosure is relatively simple in structure, and therefore, is beneficial to reduce the overall volume of the antenna, so as to meet the miniaturization design requirements of the antenna.

In some embodiments of the present disclosure, the waveguide power divider includes a waveguide power dividing structure of at least one level, and each level of the waveguide power dividing structure includes one input section and two output sections. The input section of a first level of the waveguide power dividing structure is connected to the first port, the input section of a level, other than the first level, of the waveguide power dividing structure is connected to the output section of a level, previous to this layer, of the waveguide power dividing structure, and the output section of a last level of the waveguide power dividing structure is connected to the second port.

In some embodiments of the present disclosure, the input section of each level of the waveguide power dividing structure includes a first section and a second section that are sequentially disposed along the transmission direction of the electromagnetic wave, and the diameter of the second section is smaller than the diameter of the first section.

In some embodiments of the present disclosure, each level of the waveguide power dividing structure further includes a sharp wedge, which is disposed between the two output sections and is opposite to the input section.

In some embodiments of the present disclosure, the length of the sharp wedge is 0.05 to 0.6 times the wavelength corresponding to the minimum design operating frequency of the antenna, and the length of the input section is 0.15 to 0.6 times the wavelength corresponding to the minimum design operating frequency of the antenna.

In some embodiments of the present disclosure, the radiating unit further includes a choke portion, which is disposed at one end of the housing where the second port is formed.

In some embodiments of the present disclosure, the housing includes a first housing portion and a second housing portion connected to each other, and a recess is formed on one side of the first housing portion facing the second housing portion. The recess and the second housing portion define the waveguide power divider together.

In some embodiments of the present disclosure, a positioning protrusion is provided on one of the first housing portion and the second housing portion, and the other of the first housing portion and the second housing portion is provided with a positioning groove adapted to the positioning protrusion.

The embodiment in a second aspect of the present disclosure proposes a combined antenna, which includes a mounting rack and a plurality of antennas disposed on the mounting rack, and the antenna is an antenna in any one of the above embodiments.

As a constituent unit of the combined antenna according to an embodiment of the present disclosure, the antenna includes a feeding network unit and a radiating unit, wherein the radiating unit further includes a waveguide power divider. The antenna can be used as a transmitting antenna, a receiving antenna, or an antenna with both transmitting and receiving functions. When the antenna is used as a transmitting antenna, the first port in the housing is a signal input port, and the second port is a signal output port. In this case, after the electromagnetic wave input from the first port is divided by the waveguide power divider, the electromagnetic wave is transmitted to the radiating unit through the second port, and is radiated to a free space by the radiator of the radiating unit. When the antenna is used as a receiving antenna, the second port in the housing is a signal input port, and the first port is a signal output port. In this case, the radiator of the radiating unit receives the electromagnetic wave from the free space and guides the electromagnetic wave into the second port. After the electromagnetic wave enters the second port and is merged by the waveguide power divider, the electromagnetic wave is output through the first port. The antenna constructs feeding network by using a waveguide power divider, and the waveguide power divider itself has the characteristics of low loss and being suitable for high-power transmission. Therefore, the antenna in the embodiment of the present disclosure also has the advantages of low loss and being suitable for high-power transmission. In addition, the antenna in the embodiment of the present disclosure is relatively simple in structure, and therefore, is beneficial to reduce the overall volume of the antenna, so as to meet the miniaturization design requirements of the antenna. Based on the above advantages of the antenna, the combined antenna of the embodiments of the present disclosure also has the advantages of low loss, being suitable for high-power transmission, and relatively small volume.

In some embodiments of the present disclosure, the radiators of a part of the antennas are horizontally polarized radiators, and the radiators of the other part of the antennas are vertically polarized radiators.

BRIEF DESCRIPTION OF THE DRAWINGS

In order to more clearly describe the technical solution of the embodiments of the disclosure and the prior art, drawings needed in the embodiments and the prior art will be briefly described below. Obviously, the drawings described below are for only some embodiments of the present disclosure, one of ordinary skills in the art can also obtain other drawings based on these drawings.

DETAILED DESCRIPTION

Figure 1:
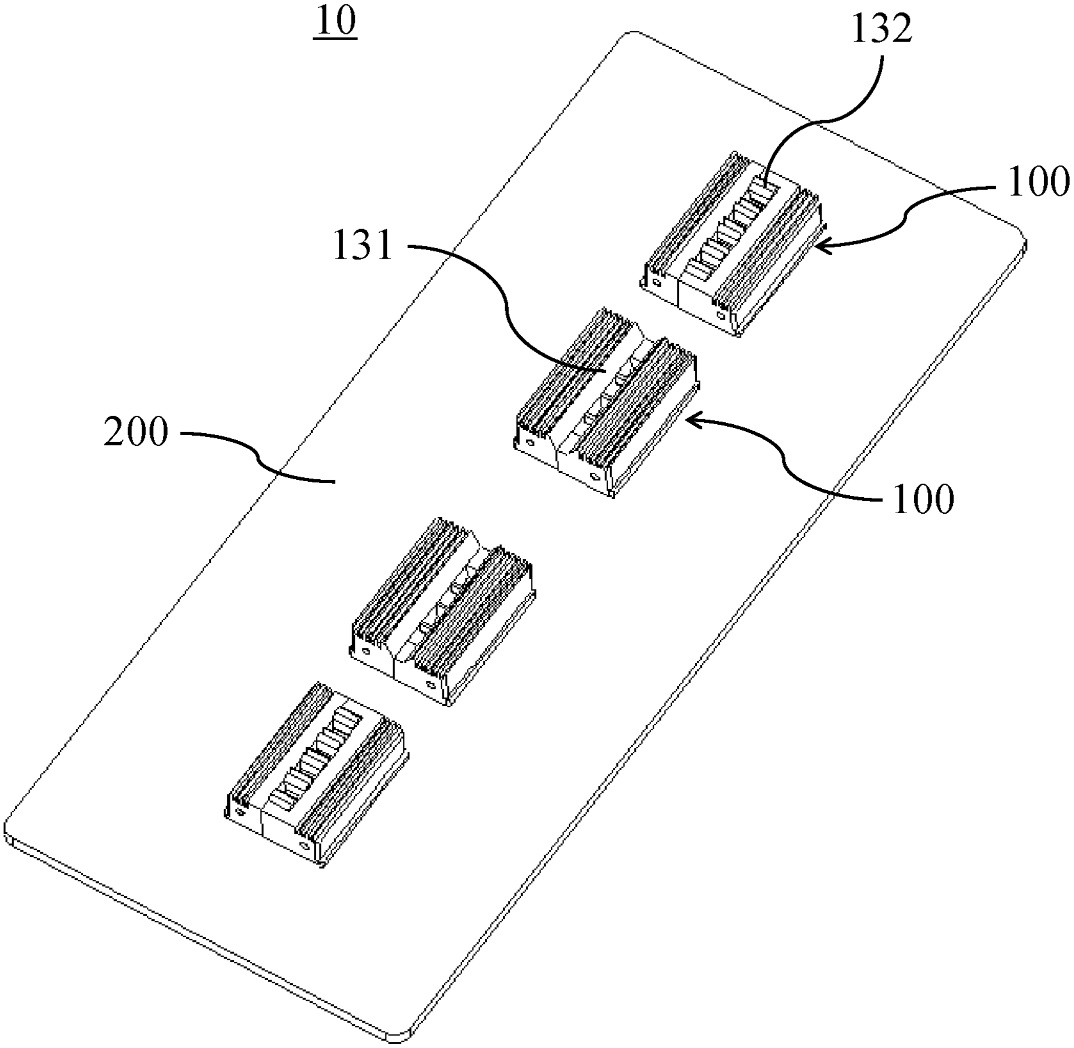
FIG. 1 is a schematic structural diagram of a combined antenna according to one embodiment of the disclosure.
Figure 2:
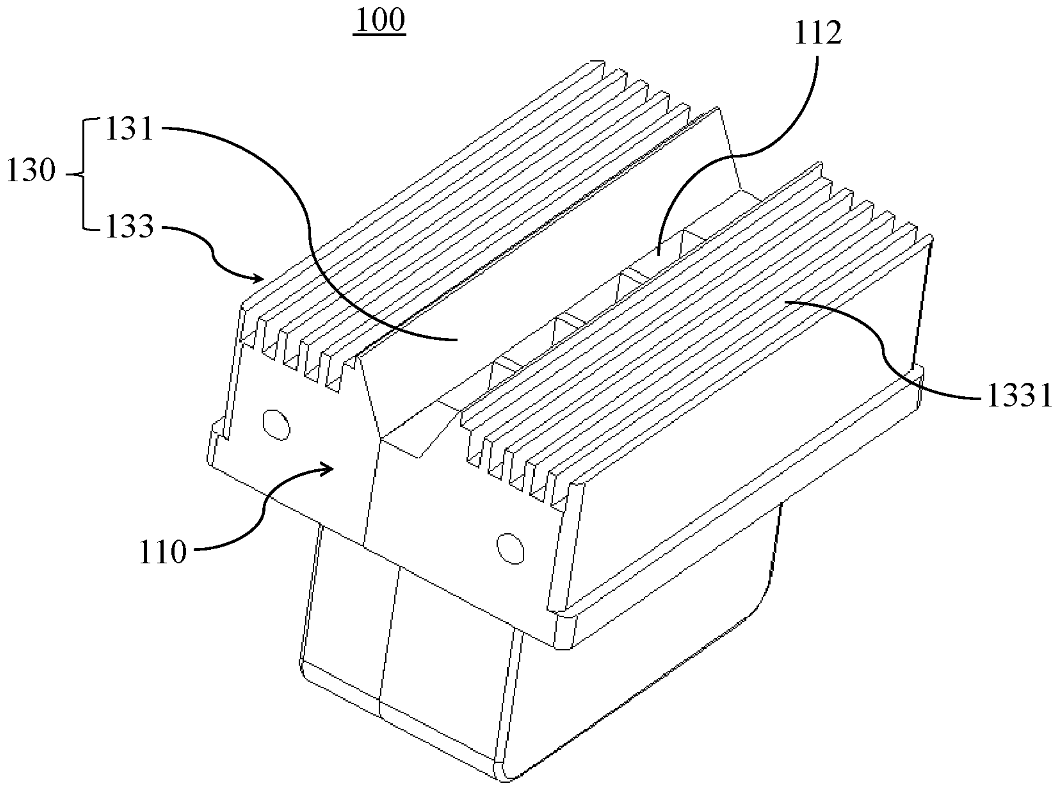
FIG. 2 is a schematic structural diagram of an antenna (a horizontally polarized antenna) according to one embodiment of the disclosure.
Figure 3:
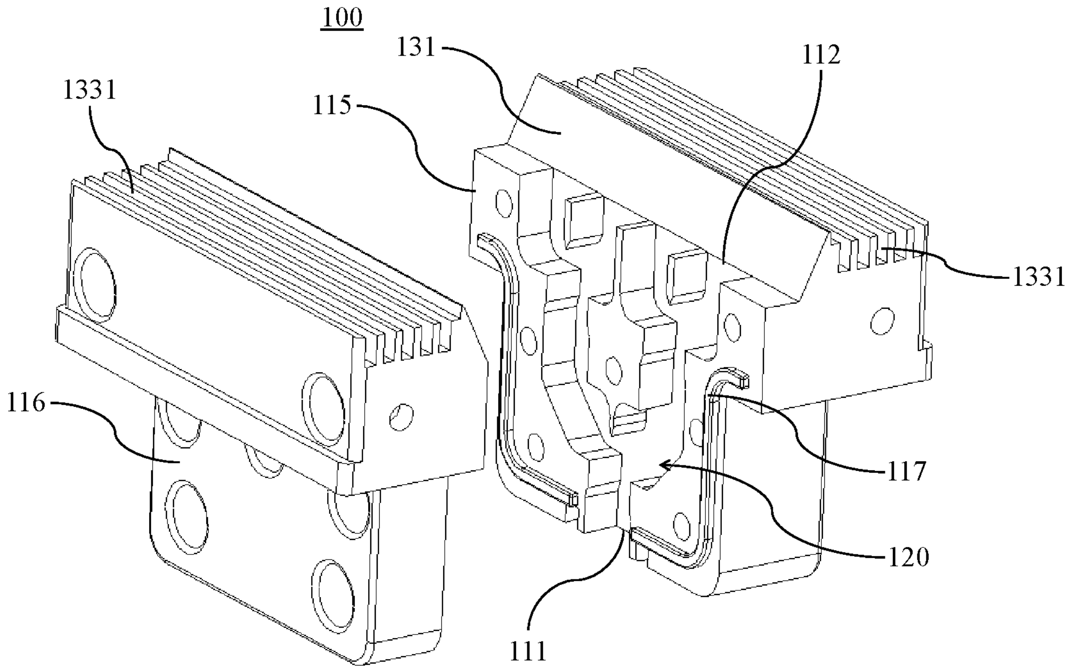
FIG. 3 is an exploded schematic diagram of an antenna according to one embodiment of the disclosure.
Figure 4:
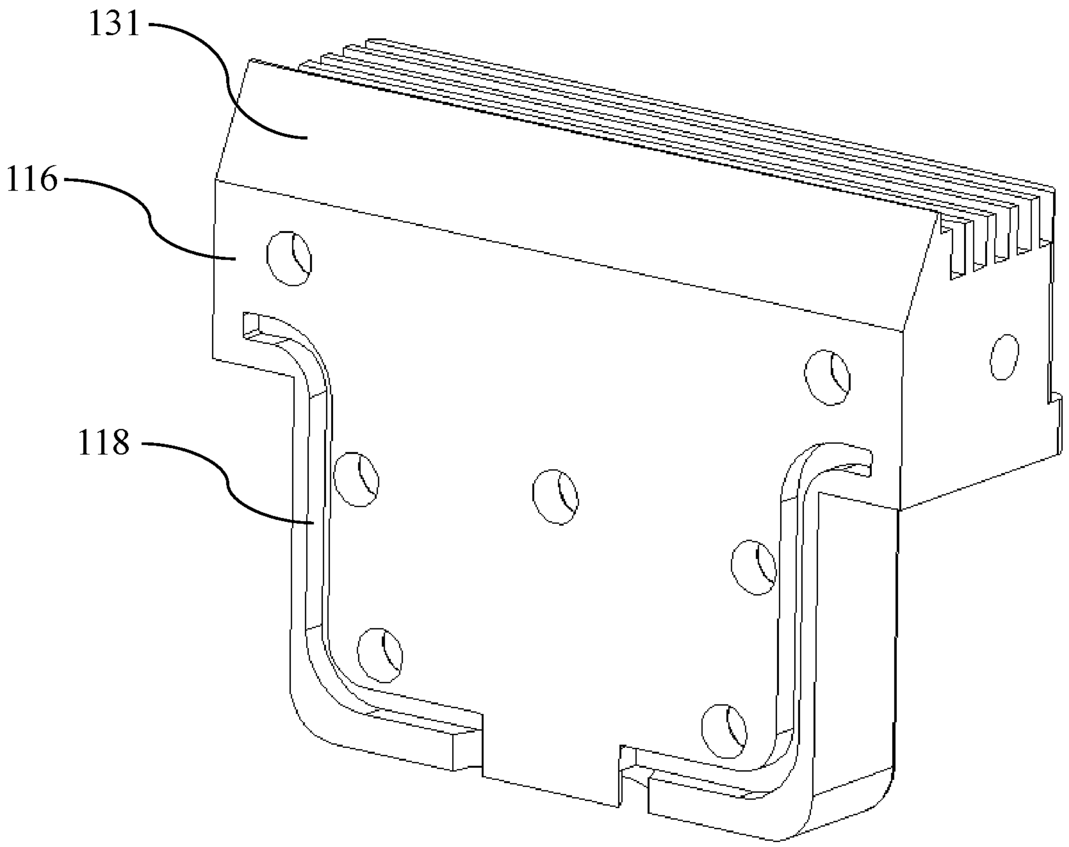
FIG. 4 is a schematic structural diagram of a second section of a housing of one antenna according to one embodiment of the disclosure.
Figure 5:
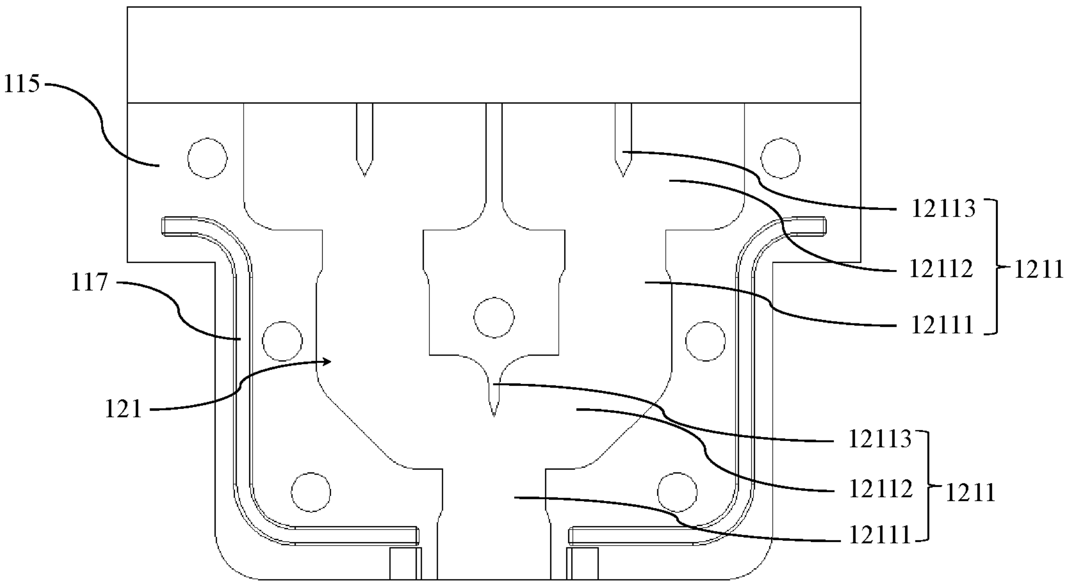
FIG. 5 is a schematic diagram of a waveguide power divider of an antenna according to one embodiment of the disclosure.

In order to make objectives, technical solutions and advantages of the present disclosure more apparent, the present disclosure now will be described in detail with reference to the accompanying drawings and the detailed description. Obviously, the embodiments described are only some of the embodiments of the present disclosure instead of all the embodiments. All other embodiments obtained by those of ordinary skill in the art based on the embodiments in the present disclosure fall within the protection scope of the present disclosure.

As shown in FIGS. 1 to 3 and FIGS. 6 and 7, an embodiment in a first aspect of the present disclosure proposes an antenna 100, which includes a housing 110, a feeding network unit 120 and a radiating unit 130. Specifically, a first port 111 and a second port 112 are formed in the housing 110, and the feeding network unit 120 is disposed inside the housing 110. The feeding network unit 120 includes a waveguide power divider 121 connecting the first port 111 and the second port 112, and the waveguide power divider 121 is configured for dividing an electromagnetic wave transmitted from the first port 111 to the second port 112, or merging the electromagnetic wave transmitted from the second port 112 to the first port 111. The radiating unit 130 includes a radiator disposed on the housing 110 and close to the second port 112.

The antenna 100 according to an embodiment of the present disclosure includes a feeding network unit 120 and a radiating unit 130, wherein the radiating unit 130 further includes a waveguide power divider 121. The antenna 100 can be used as a transmitting antenna, a receiving antenna, or an antenna with both transmitting and receiving functions. When the antenna 100 is used as a transmitting antenna, the first port 111 in the housing 110 is a signal input port, and the second port 112 is a signal output port. In this case, after the electromagnetic wave input from the first port 111 is divided by the waveguide power divider 121, the electromagnetic wave is transmitted to the radiating unit 130 through the second port 112, and is radiated to a free space by the radiator of the radiating unit 130. When the antenna 100 is used as a receiving antenna, the second port 112 in the housing 110 is a signal input port, and the first port 111 is a signal output port. In this case, the radiator of the radiating unit 130 receives the electromagnetic wave from the free space and guides the electromagnetic wave into the second port 112. After the electromagnetic wave enters the second port 112 and is merged by the waveguide power divider 121, the electromagnetic wave is output through the first port 111.

The antenna 100 in the embodiment of the present disclosure constructs a feeding network by using a waveguide power divider 121, and the waveguide power divider 121 itself has the characteristics of low loss and being suitable for high-power transmission. Therefore, the antenna 100 in the embodiment of the present disclosure also has the advantages of low loss and being suitable for high-power transmission. In addition, the structure of antenna 100 in the embodiment of the present disclosure is relatively simple, and therefore, is beneficial to reduce the overall volume of the antenna 100, so as to meet the miniaturization design requirements of the antenna.

Figure 6:
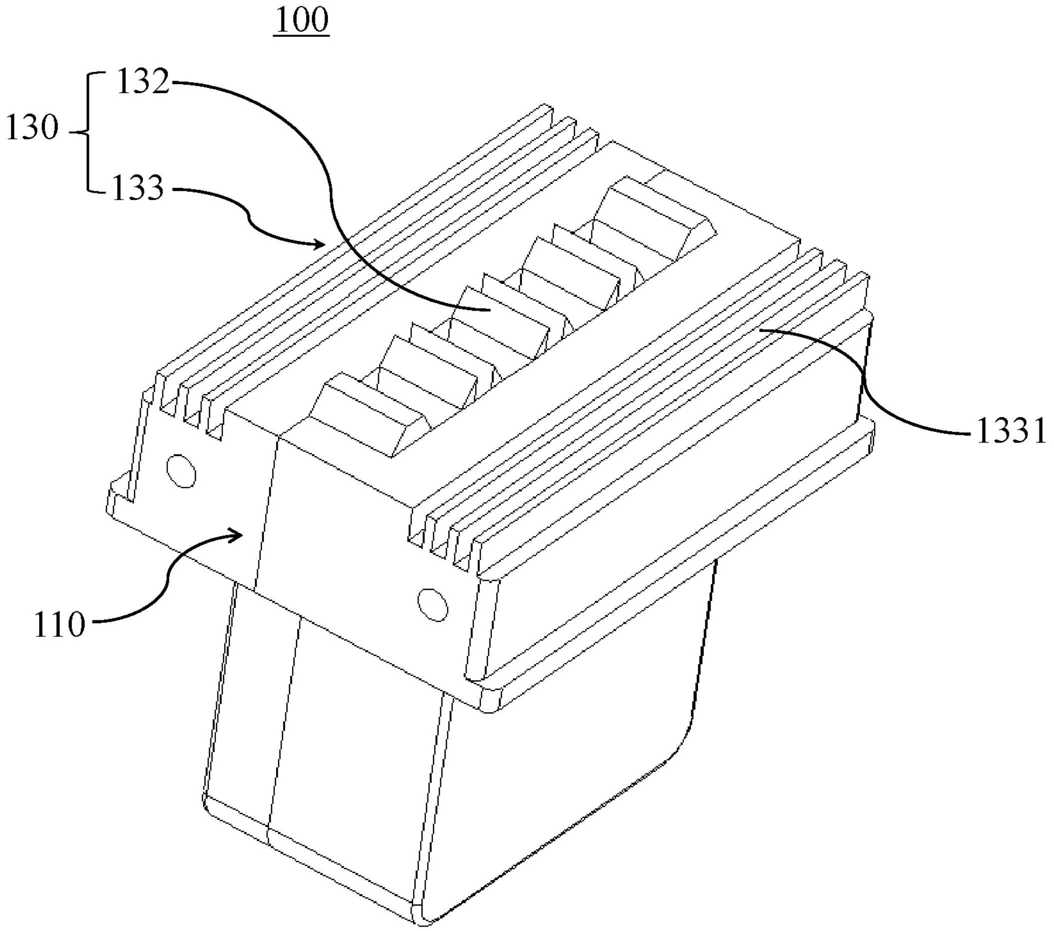
FIG. 6 is a schematic structural diagram of another antenna (a vertically polarized antenna) according to one embodiment of the disclosure.
Figure 7:
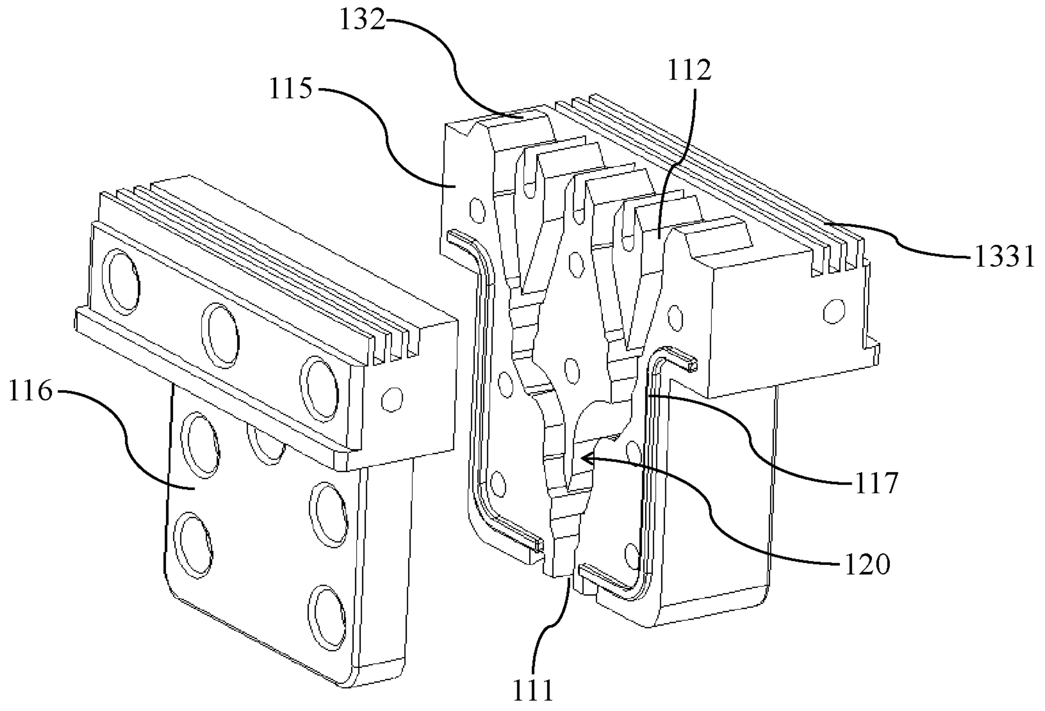
FIG. 7 is an exploded schematic diagram of an antenna according to another embodiment of the disclosure.
Figure 8:
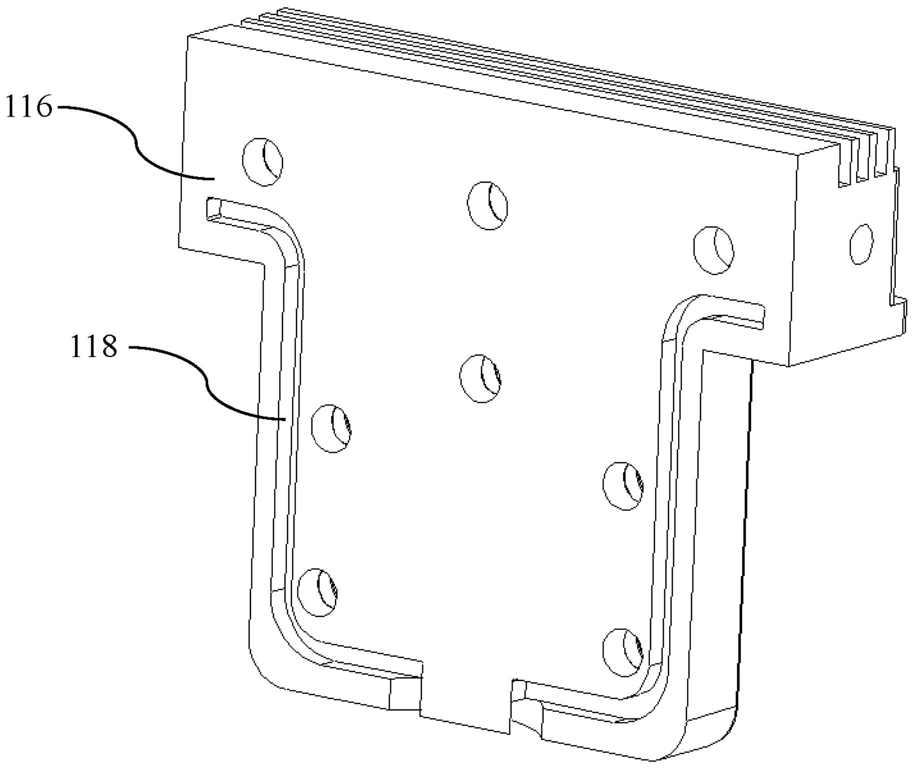
FIG. 8 is a schematic structural diagram of a second section of a housing of an antenna according to another embodiment of the disclosure.
Figure 9:
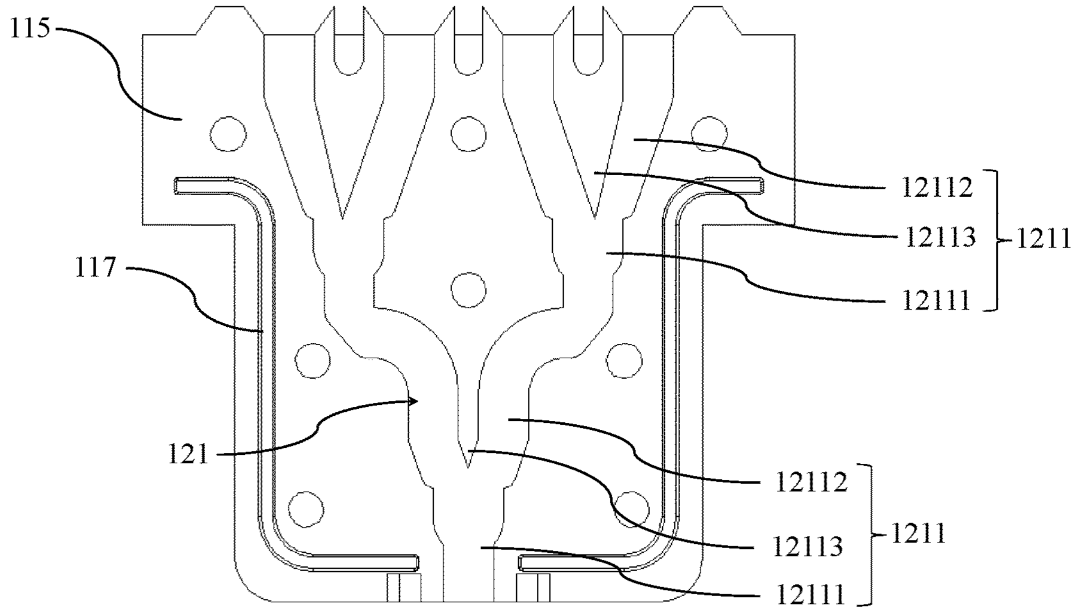
FIG. 9 is a schematic diagram of a waveguide power divider of an antenna according to another embodiment of the disclosure.

In some embodiments of the present disclosure, the radiator may be a horizontally polarized radiator 131 (please refer to FIG. 2) or a vertically polarized radiator 132 (please refer to FIG. 6). When the radiator is a horizontally polarized radiator 131, the antenna 100 is a horizontally polarized antenna 100; when the radiator is a vertically polarized radiator 132, the antenna 100 is a vertically polarized antenna 100. In other words, the antenna 100 can be used as a horizontally polarized antenna 100 or a vertically polarized antenna 100 depending on the type of the radiator used.

In addition, the angle of the radiation pattern of the antenna 100 can also be controlled by the radiator, that is, the angle of the radiation pattern of the antenna 100 can be changed by adjusting relevant parameters of the radiator (such as width, height, and inclination, etc.). For example, after adjusting the relevant parameters of the radiator, the 3 dB lobe width of the horizontal pattern can be easily adjusted to 90°, 75°, 45°, 30° or the like.

In some embodiments of the present disclosure, as shown in FIG. 3, FIG. 5, FIG. 7 and FIG. 9, the waveguide power divider 121 includes a waveguide power dividing structure 1211 of at least one level, and each level of the waveguide power dividing structure 1211 includes one input section 12111 and two output sections 12112. The input section 12111 of a first level of the waveguide power dividing structure 1211 is connected to the first port 111, the input section 12111 of a level, other than the first level, of the waveguide power dividing structure 1211 is connected to the output section 12112 of a level, previous to this layer, of the waveguide power dividing structure 1211, and the output section 12112 of a last level of the waveguide power dividing structure 1211 is connected to the second port 112. Each level of the waveguide power dividing structure 1211 in this embodiment has a division function of dividing the electromagnetic wave into two paths. It can be understood that the number of levels of the waveguide power dividing structure 1211 can be set according to the expected number of the electromagnetic waves being divided. When the waveguide power dividing structure 1211 has only one level, the electromagnetic wave can be divided into two paths. When the waveguide power dividing structure 1211 has two levels, the electromagnetic wave can be divided into four paths. When the waveguide power dividing structure 1211 has three levels, the electromagnetic wave can be divided into eight paths, and so forth.

In some embodiments of the present disclosure, the input section 12111 of each level of waveguide power dividing structure 1211 includes a first section and a second section sequentially disposed along the transmission direction of the electromagnetic wave, and the diameter of the second section is smaller than that of the first section, so that the input section 12111 forms an impedance ladder at a position where the second section and the first section are connected, and the impedance ladder is used to achieve impedance matching of the antenna 100.

Further, each level of the waveguide power dividing structure 1211 further includes a sharp wedge 12113 which is disposed between two output sections 12112 and is opposite to the input section 12111. The sharp wedge 12113 is used to assist in the division of the electromagnetic wave, which is beneficial to improve the isolation between the two output sections 12112. In addition, the use of the sharp wedge 12113 can minimize the energy reflection of the electromagnetic wave, thereby avoiding energy loss of the electromagnetic wave. In the embodiment of the present disclosure, voltage standing wave ratio of the waveguide power divider 121 can be improved under the synergistic effect of the sharp wedge 12113 and the impedance ladder. In one specific example, the length of the sharp wedge 12113 is 0.05 to 0.6 times the wavelength corresponding to the minimum design operating frequency of the antenna 100, and the length of the input section 12111 is 0.15 to 0.6 times the wavelength corresponding to the minimum design operating frequency of the antenna 100. The test verifies that when the above numerical range is satisfied, it can be ensured that the voltage standing wave ratio between an input end and an output end of the waveguide power divider 121 is less than 1.15. In addition, it has been verified that when the voltage standing wave ratio of the waveguide power divider 121 is less than 1.15, its bandwidth can reach 24%. In addition, each of bending parts of the waveguide power divider 121 can be transitioned by using a circular arc structure. Specifically, the radius of the circular arc structure can be greater than or equal to 0.05 times the wavelength corresponding to the minimum design operating frequency. Therefore, the voltage standing wave ratio between the output section 12112 of the waveguide power dividing structure 1211 and the next level of the waveguide power dividing structure 1211 can be further reduced to less than 1.04.

In some embodiments of the present disclosure, the waveguide power divider 121 is made of metal, such as gold, silver, copper, iron, aluminum, steel, or alloy material, etc.

In some embodiments of the present disclosure, the radiating unit 130 further includes a choke portion 133, which is disposed at one end of the housing 110 where the second port 112 is formed. The function of the choke portion 133 is to adjust the angle of the radiation pattern of the antenna 100 and improve a front-to-back ratio. Furthermore, there may be two choke portions 133, which may be disposed on both sides of the second port 112. Specifically, the choke portion 133 may include a plurality of choke grooves 1331 disposed in parallel, and the larger the number of choke grooves 1331, the better the front-to-back ratio of the radiation pattern of the antenna 100. The test verifies that when the choke portion 133 includes five choke grooves 1331 disposed in parallel, the front-to-back ratio of the radiation pattern of the antenna 100 can be increased by about 13 dB.

In some embodiments of the present disclosure, the depth of the choke groove 1331 is 0.1 to 1 times the wavelength corresponding to the minimum design operating frequency. After multiple tests and verifications, the depth of the choke groove 1331 is within the above range, which can ensure that the choke groove 1331 has the effect of significantly improving the front-to-back ratio of the radiation pattern of the antenna 100.

In some embodiments of the present disclosure, as shown in FIG. 3, FIG. 4, FIG. 7 and FIG. 8, the housing 110 includes a first housing portion 115 and a second housing portion 116 connected to each other, and a recess is formed at one side of the first housing portion 115 facing the second housing portion 116. The recess and the second housing portion 116 define the waveguide power divider 121 together. Wherein, the first housing portion 115 and the second housing portion 116 can be fixed together, for example, by screw connection, welding, or the like. The first housing portion 115 and the second housing portion 116 in the embodiment of the present disclosure can be separately processed and formed, and then further combined together, so that the waveguide power divider 121 can be easily processed and manufactured, and the processing accuracy of the waveguide power divider 121 can be improved, so as to ensure the working effect of the waveguide power divider 121.

In one specific example, a positioning protrusion 117 is provided on the first housing portion 115, and a positioning groove 118 adapted to the positioning protrusion 117 is provided in the second housing portion 116. In the process of assembling the first housing portion 115 and the second housing portion 116, the engagement between the positioning protrusion 117 and the positioning groove 118 can be used to align and closely contact the first housing portion 115 with the second housing portion 116, and then operations such as tightening screws or welding are performed on the housing portion 115 and the second housing portion 116. In this way, the position error in the process of assembling the first housing portion 115 and the second housing portion 116 can be reduced, thereby ensuring the forming accuracy of the waveguide power divider 121. In some other specific examples, a positioning protrusion 117 may also be provided on the second housing portion 116, and a positioning groove 118 adapted to the positioning protrusions 117 may be provided in the first housing portion 115, that is, the positions of the positioning protrusion 117 and the positioning groove 118 may be reverse.

Figure 10:
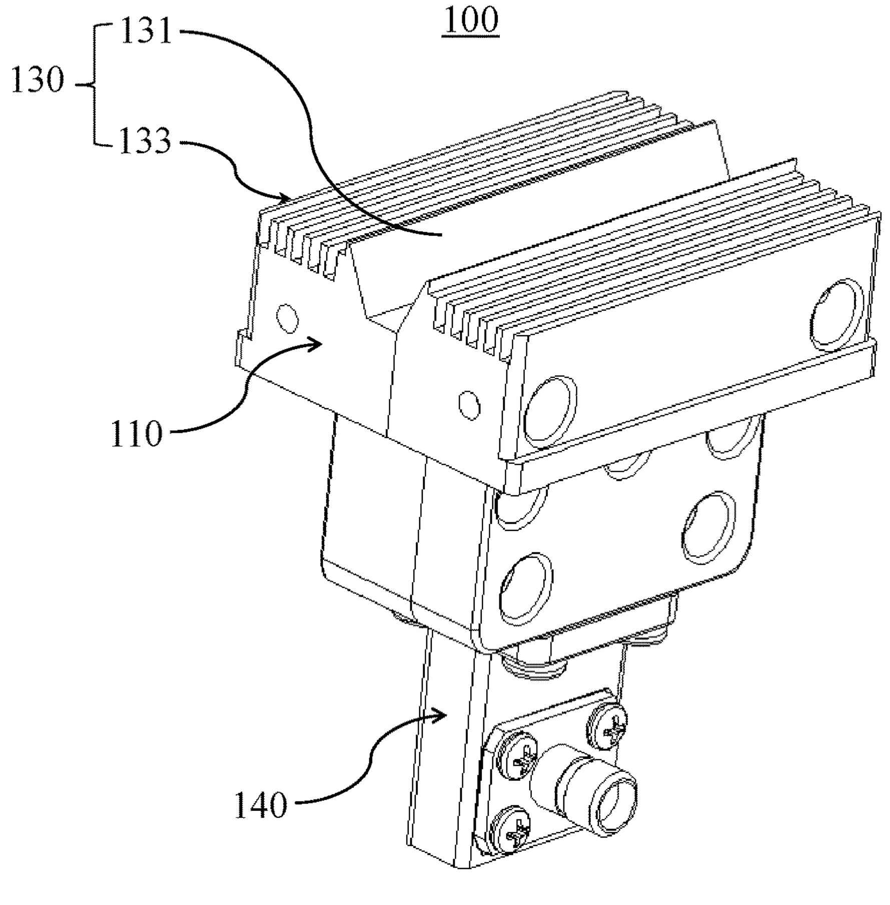
FIG. 10 is a schematic structural diagram of an antenna (a horizontally polarized antenna) according to one embodiment of the disclosure in which a connector is provided.
Figure 11:
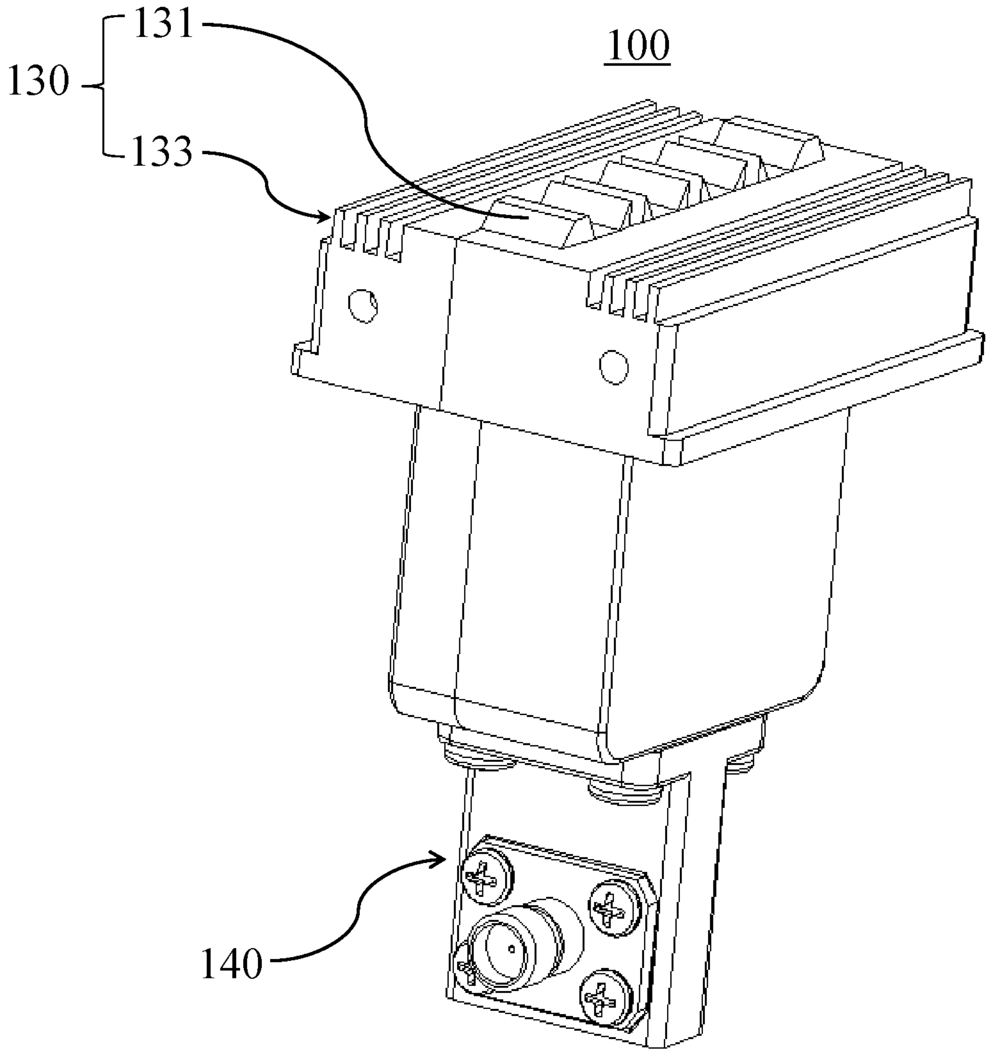
FIG. 11 is a schematic structural diagram of an antenna (a vertically polarized antenna) according to another embodiment of the disclosure in which a connector is provided.

In some embodiments of the present disclosure, as shown in FIG. 10 and FIG. 11, the antenna 100 further includes a connector 140 connected to the housing 110. The connector 140 may be, for example, a coaxial waveguide connector, a microstrip waveguide connector, circular waveguide connectors, etc., as long as they meet the requirements of waveguide transmission mode.

The embodiment in a second aspect of the present disclosure proposes a combined antenna 10, which includes a mounting rack 200 and a plurality of antennas 100 disposed on the mounting rack 200, and the antenna 100 is an antenna 100 in any one of the above embodiments.

As a constituent unit of the combined antenna 10 according to an embodiment of the present disclosure, the antenna 100 includes a feeding network unit 120 and a radiating unit 130, wherein the radiating unit 130 further includes a waveguide power divider 121. The antenna 100 can be used as a transmitting antenna, a receiving antenna, or an antenna with both transmitting and receiving functions. When the antenna 100 is used as a transmitting antenna, the first port 111 in the housing 110 is a signal input port, and the second port 112 is a signal output port. In this case, after the electromagnetic wave input from the first port 111 is divided by the waveguide power divider 121, the electromagnetic wave is transmitted to the radiating unit 130 through the second port 112, and is radiated to a free space by the radiator of the radiating unit 130. When the antenna 100 is used as a receiving antenna, the second port 112 in the housing 110 is a signal input port, and the first port 111 is a signal output port. In this case, the radiator of the radiating unit 130 receives the electromagnetic wave from the free space and guides the electromagnetic wave into the second port 112. After the electromagnetic wave enters the second port 112 and is merged by the waveguide power divider 121, the electromagnetic wave is output through the first port 111. The antenna 100 constructs feeding network by using a waveguide power divider 121, and the waveguide power divider 121 itself has the characteristics of low loss and being suitable for high-power transmission. Therefore, the antenna 100 in the embodiment of the present disclosure also has the advantages of low loss and being suitable for high-power transmission. In addition, the structure of antenna 100 in the embodiment of the present disclosure is relatively simple, and therefore, is beneficial to reduce the overall volume of the antenna 100, so as to meet the miniaturization design requirements of the antenna. Based on the above advantages of the antenna 100, the combined antenna 10 of the embodiments of the present disclosure also has the advantages of low loss, being suitable for high-power transmission, and relatively small volume.

Further, a plurality of installation openings may be provided in the mounting rack 200, and each antenna 100 is correspondingly installed at one installation opening. In addition, the antenna 100 and the mounting rack 200 can be connected by bolts, which not only leads to a stable connection, but also is convenient for later disassembly for maintenance or replacement.

In some embodiments of the present disclosure, among the plurality of antennas 100 disposed on the mounting rack 200, the radiators of a part of the antennas 100 are horizontally polarized radiators 131, and the radiators of the other part of the antennas 100 are vertically polarized radiators 132. That is, a part of the antennas 100 are horizontally polarized antennas 100, and the other part of the antennas 100 are vertically polarized antennas 100. Specifically, the antennas 100 in the combined antenna 10 can be disposed in groups, that is, a horizontally polarized antenna 100 and a vertically polarized antenna 100 can become a group of antennas 100, so that a group of antennas 100 form a dual polarized antennas 100.

In some other embodiments of the present disclosure, the antennas 100 disposed on the mounting rack 200 may also be all horizontally polarized antennas 100 or all vertically polarized antennas 100, which can be set according to usage requirements.

It should be noted that the relationship terms herein such as "first", "second", and the like are only configured for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

All the embodiments are described in corresponding ways, same or similar parts in each of the embodiments can be referred to one another, and the parts emphasized are differences to other embodiments.

The description is only for preferred embodiments of the present disclosure, and is not intended to limit the present disclosure. Any modifications, substitutions, improvements, etc., which are made within the spirit and principles of the present disclosure, shall fall within the protection scope of the present disclosure.

What is claimed is:

1. An antenna, comprising:

a housing in which a first port and a second port are formed;

a feeding network unit disposed inside the housing, wherein the feeding network unit comprises a waveguide power divider connecting the first port and the second port, and the waveguide power divider is configured for dividing a first electromagnetic wave transmitted from the first port to the second port, or merging a second electromagnetic wave transmitted from the second port to the first port; and a radiating unit, which comprises a radiator disposed on the housing and close to the second port, and wherein the radiating unit further comprises a choke portion, the choke portion being disposed at one end of the housing where the second port is formed.

2. The antenna of claim 1, wherein the waveguide power divider comprises a waveguide power dividing structure of multiple levels such that each level of the waveguide power dividing structure comprises one input section and two output sections, a first input section of a first level of the waveguide power dividing structure is connected to the first port, a second input section of a second level of the waveguide power dividing structure is connected to a first output section of the first level, and a second output section of a last level of the waveguide power dividing structure is connected to the second port.

3. The antenna of claim 2, wherein the input section of each level of the waveguide power dividing structure comprises a first section and a second section that are sequentially disposed along a transmission direction of the first electromagnetic wave or the second electromagnetic wave, and a diameter of the second section is smaller than a diameter of the first section.

4. The antenna of claim 3, wherein each level of the waveguide power dividing structure further comprises a sharp wedge, which is disposed between the two output sections and is opposite to the input section.

5. The antenna of claim 4, wherein a length of the sharp wedge is 0.05 to 0.6 times a wavelength corresponding to a minimum design operating frequency of the antenna, and a length of the input section is 0.15 to 0.6 times the wavelength corresponding to the minimum design operating frequency of the antenna.

6. The antenna of claim 1, wherein the housing comprises a first housing portion and a second housing portion connected to each other, and a recess is formed on one side of the first housing portion facing the second housing portion, the recess and the second housing portion define the waveguide power divider together.

7. The antenna of claim 6, wherein a positioning protrusion is provided on one of the first housing portion and the second housing portion, and the other of the first housing portion and the second housing portion is provided with a positioning groove adapted to the positioning protrusion.

8. A combined antenna, comprising a mounting rack and a plurality of antennas disposed on the mounting rack, each of the plurality of antennas having:

a housing in which a first port and a second port are formed, a feeding network unit disposed inside the housing, wherein the feeding network unit comprises a waveguide power divider connecting the first port and the second port, and the waveguide power divider is configured for dividing a first electromagnetic wave transmitted from the first port to the second port, or merging a second electromagnetic wave transmitted from the second port to the first port, and a radiating unit, which comprises a radiator disposed on the housing and close to the second port, and wherein the radiating unit further comprises a choke portion, the choke portion being disposed at one end of the housing where the second port is formed.

9. The combined antenna of claim 8, wherein radiators of a first portion of the plurality of antennas are horizontally polarized radiators, and radiators of a second portion of the plurality of antennas are vertically polarized radiators.

10. The combined antenna of claim 8, wherein the waveguide power divider of each antenna of the plurality of antennas comprises a waveguide power dividing structure of multiple levels such that each level of the waveguide power dividing structure comprises one input section and two output sections, a first input section of a first level of the waveguide power dividing structure is connected to the first port, a second input section of a second level of the waveguide power dividing structure is connected to a first output section of the first level, and a second output section of a last level of the waveguide power dividing structure is connected to the second port.

11. The combined antenna of claim 10, wherein the input section of each level of the waveguide power dividing structure comprises a first section and a second section that are sequentially disposed along a transmission direction of the first electromagnetic wave or the second electromagnetic wave, and a diameter of the second section is smaller than a diameter of the first section.

12. The combined antenna of claim 11, wherein each level of the waveguide power dividing structure further comprises a sharp wedge, which is disposed between the two output sections and is opposite to the input section.

13. The combined antenna of claim 12, wherein a length of the sharp wedge is 0.05 to 0.6 times a wavelength corresponding to a minimum design operating frequency of the antenna, and a length of the input section is 0.15 to 0.6 times the wavelength corresponding to the minimum design operating frequency of the antenna.

14. The combined antenna of claim 8, wherein the housing comprises a first housing portion and a second housing portion connected to each other, and a recess is formed on one side of the first housing portion facing the second housing portion, the recess and the second housing portion define the waveguide power divider together.

15. The combined antenna of claim 14, wherein a positioning protrusion is provided on one of the first housing portion and the second housing portion, and the other of the first housing portion and the second housing portion is provided with a positioning groove adapted to the positioning protrusion.

* * * * *